No. 727,412. PATENTED MAY 5, 1903.
H. T. & W. H. McCORMICK.
GRASS SEED STRIPPER.
APPLICATION FILED MAY 19, 1902.
NO MODEL. 2 SHEETS—SHEET 1.

WITNESSES: INVENTORS
Geo. P. Kingsbury Harry T. McCormick.
Edw. W. Byrn William H. McCormick.
BY Munn & Co.
ATTORNEYS No. 727,412. PATENTED MAY 5, 1903.
H. T. & W. H. McCORMICK.
GRASS SEED STRIPPER.
APPLICATION FILED MAY 19, 1902.
NO MODEL. 2 SHEETS—SHEET 2.
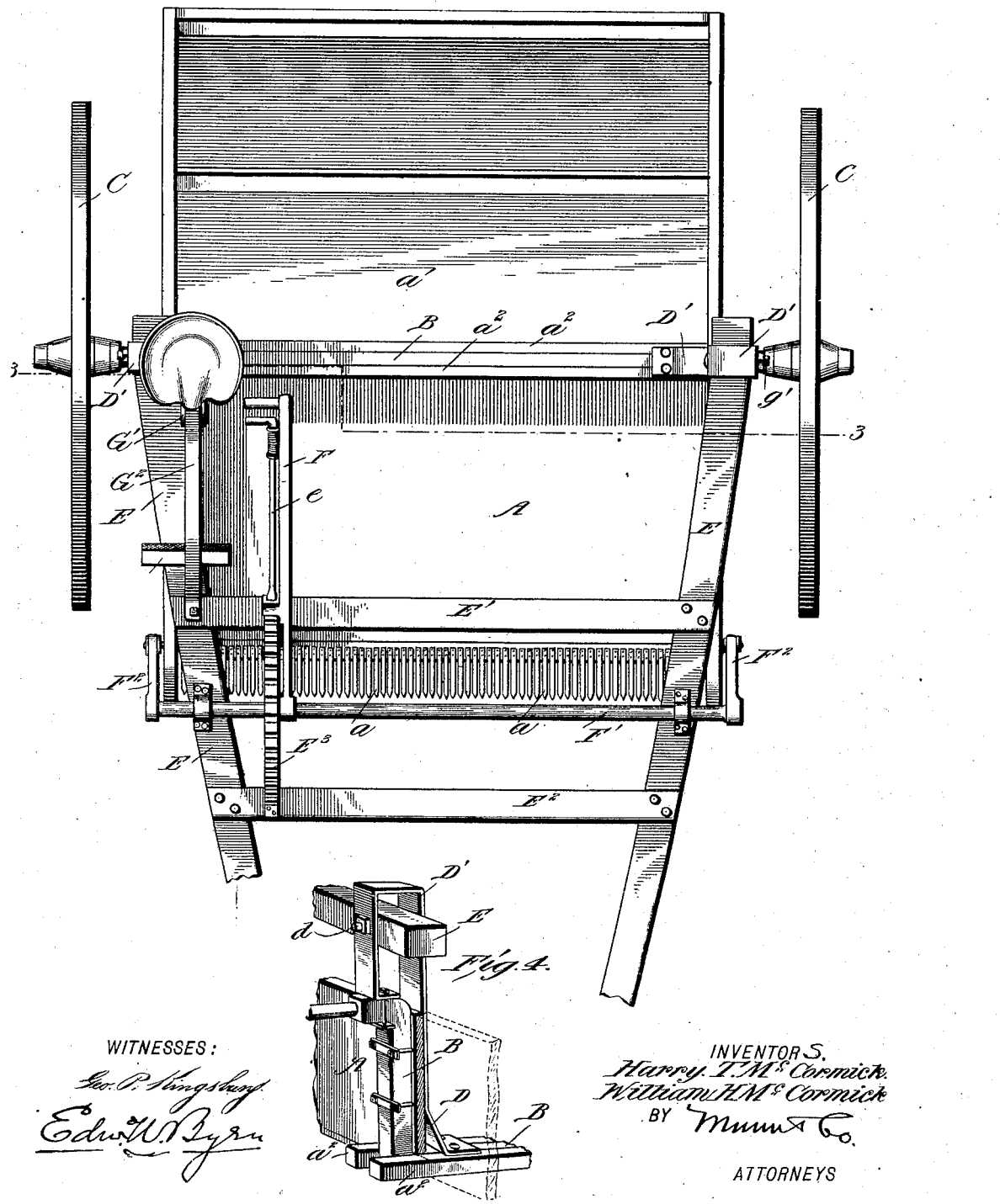
WITNESSES:
Geo. P. Kingsbury
Edw. H. Byrn
INVENTORS.
Harry T. McCormick.
William H. McCormick
BY Munn & Co.
ATTORNEYS No. 727,412.

Patented May 5, 1903.

UNITED STATES PATENT OFFICE.

HARRY T. McCORMICK AND WILLIAM H. McCORMICK, OF WINCHESTER, KENTUCKY.

GRASS-SEED STRIPPER.

SPECIFICATION forming part of Letters Patent No. 727,412, dated May 5, 1903.

Application filed May 19, 1902. Serial No. 107,993. (No model.)

*To all whom it may concern:*

Be it known that we, HARRY T. McCORMICK and WILLIAM H. McCORMICK, of Winchester, in the county of Clark and State of Kentucky, have invented a new and useful Improvement in Grass-Seed Strippers, of which the following is a specification.

Our invention is in the nature of an improvement in that class of devices employed for stripping off grass-seed or the heads of grain, and which are sometimes known as "headers." The characteristic form of this class of machine is a gathering-box mounted on wheels and having at its front edge a series of closely-juxtaposed and forwardly-projecting parallel teeth, forming a comb which catches the stems of grass or grain just below the heads and stripping the seed off delivers them into the box as the machine is dragged or pushed across the field. In this form of machine the axle usually extends across the top of the box, and as the workman who rakes the seed back from the comb into the box has to squat in the box beneath the axle the running wheels of the axle are required to be made unduly large and high. On the other hand, if the axle be straight and goes straight across and below the bottom of the box the wheels would be too small and low, because the box itself must occupy a position close to the ground. We overcome these difficulties by making a box which is entirely open above it—*i. e.*, it has no axle extending across the top of it and yet has wheels of the proper size, neither too large nor too small, and allows the box to occupy a position close to the ground. For this purpose we employ a cranked axle which dips down around the sides of the box and then passes underneath the same and is combined with brackets and braces which firmly unite the axle to the box and connect also with the rear ends of the shafts and the seat to form a simple, strong, and practical construction, as will be hereinafter fully described with reference to the drawings, in which—

Figure 1:
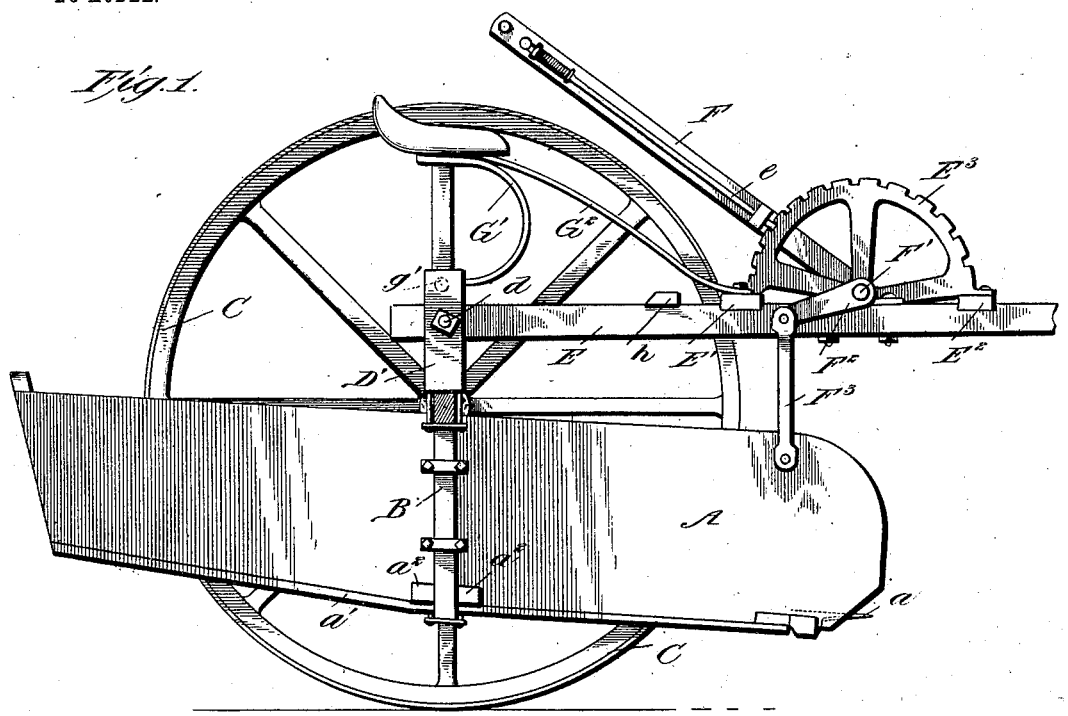
Figure 3:
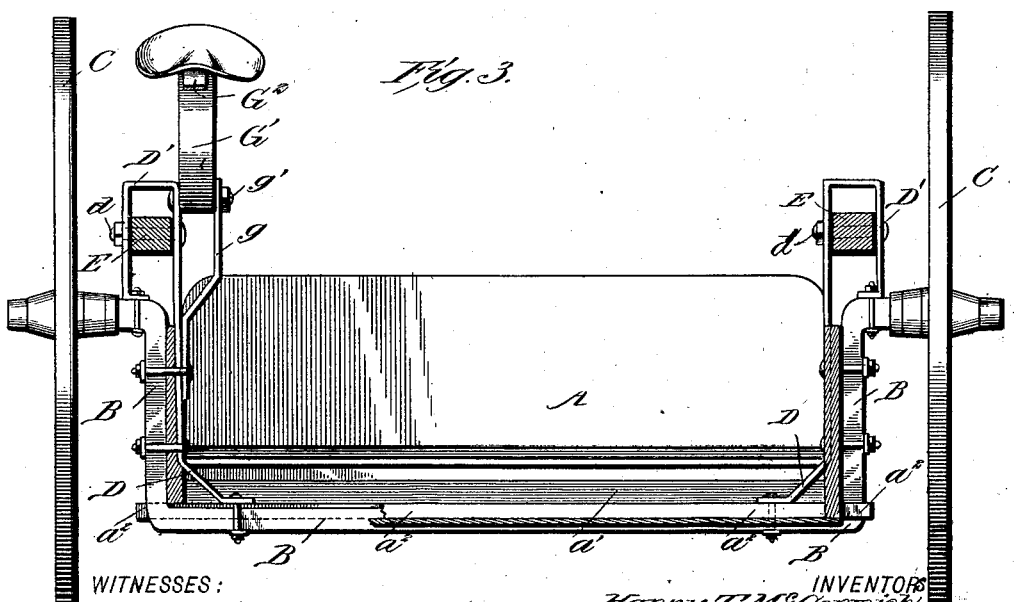

Figure 1 is a side elevation with one wheel removed. Fig. 2 is a plan view; Fig. 3, a vertical transverse section on line 3 3 of Fig. 2, looking in the direction of the arrow; and Fig. 4 is a perspective detail of the crank-axle connections.

In the drawings, A represents the box, which has at its front end the row of comb-teeth $a$, and which box has the rear half of its bottom at $a'$ inclined upwardly to the rear.

B is the cranked axle, whose vertical cranked portions fit snugly against the outer sides of the box and are of a vertical length about equal to the depth of the box at this point, which is about fourteen inches. Where the axle passes across the bottom of the box, said bottom is cut away, so that the axle lies in the plane of the bottom of the box and is flanked on each side by bracing-strips $a^2$ $a^2$, which extend transversely across the bottom and through the sides and have a bearing against the cranks or vertical portions of the axle on each side of the same, so as to make a stiff and strong reinforce for connecting the axle and the box.

On the spindles of the crank-axle are mounted the running-wheels C C, and as the top of the box is open or unobstructed these wheels may be of a moderate size—say four feet in diameter—and the box kept close to the ground and a plenty of room in the box for the workman to sit in the bottom of the same and rake back the seed.

For connecting and bracing the box to the axle and also forming points of attachment for the shafts we provide on each side a combined brace and loop D D', made of stout metal. The lower brace portion D is bent at an angle, so as to extend across the right angle formed between the bottom and sides of the box, and is firmly screwed or bolted to the horizontal portion of the axle or the bottom of the box and also to the vertical inside wall of the side of the box, as seen in Fig. 4. Thence it extends up above the axial line of the axle and is bent outwardly and down again to form the loop D', and the end is screwed or bolted to the top of the axle. Within this loop is arranged a horizontal bolt $d$, extending through both sides of the loop and also through the rear end of one of the shafts E, which bolts thus form draft attachments for the shafts close to the center of the wheel and form a connection about which the shafts have a free turning action up and down, so that the box may turn to raise or lower the level of its comb of teeth. The shafts E are connected to each other by two cross-bars E' E², and on these cross-bars is mounted a curved and notched bar E³, with which the dog $e$ of the handle-lever F is made to engage. This handle-lever is rigidly attached to a rock-shaft F', journaled in bearings on the shafts and bearing on its outer ends rigid arms F² F², connected by links F³ F³ to the front ends of the sides of the box. By turning the handle-lever F and allowing its dog to engage one of the notches of the curved bar the front end of the box bearing the comb is adjusted to any desired height in relation to the ground to suit the height of the grass or grain to be stripped of its seed.

On the inner side of one of the loops D' is secured a bracket-iron $g$, whose upper end is offset from the loop and connected thereto by a bolt $g'$, and on this bolt is mounted the lower end of a curved support G' for the driver's seat. Another curved bar G² is bolted to the bottom of the seat and extends forwardly and is bolted to the rear cross-bar of the shafts or to the shafts themselves, and immediately behind this point a foot-rest $h$ is secured crosswise to the shaft. These devices form a strong and substantial means for supporting the driver's seat without encroaching upon the space above the box, so that the workman therein has a full clearance to work therein.

The advantages of our invention are, first, that it gives ample room for the workman in the box and allows the use of moderate size wheels; second, the shafts are attached close to centers of the wheels, making a light draft, and, third, as the seedbox is rigid with the axle and is arranged to oscillate with the axle in the hub of the wheels instead of on the axle the machine may be used on a hillside as well as on level ground.

Having thus described our invention, what we claim as new, and desire to secure by Letters Patent, is—

1. A seed-stripper or header comprising a box having side boards, a closed rear end, an open front and top, and a bottom having a row of stripper-teeth arranged along its front edge, two supporting-wheels, a crank-axle having its middle portion extending transversely across the bottom of the box and its upright crank portions rigidly connected to the sides of the box, and its spindle portions entering the hubs of the wheels, draft attachments connected rigidly to the crank-axles and extending above the sides of the box, shafts extending over the box, and loosely pivoted to these draft attachments at points above the box, a rock-shaft arranged transversely on the shafts and having an operating-lever and rigid end cranks, and links connecting said end cranks to the front portions of the sides of the box, substantially as and for the purpose described.

2. A seed-stripper or header comprising a box open at its upper side and having stripping-teeth at its front edge, a cranked axle having its cranked portion connected to the sides of the box and its middle portion extending across the bottom of the box and lying partly in the horizontal plane of the same, reinforcing-strips arranged transversely in the bottom of the box and flanking each side of the axle and extending through the sides of the box and bearing against the vertical cranked portions of the axle, and running wheels and draft attachments substantially as shown and described.

3. A stripper or header comprising a cranked axle mounted on wheels, an open-top box having teeth at its front edge and mounted on the middle suspended portion of the cranked axle, and a combined brace and draft attachment on each side connecting the middle portion of the axle to the side of the box and having at its upper end a loop secured to the top of the cranked axle, horizontal bolts passing through said loops and shafts connected to said bolts substantially as shown and described.

4. A stripper or header comprising a cranked axle mounted on wheels, an open-top box having teeth at its front edge and mounted on the middle suspended portion of the cranked axle, a combined brace and draft attachment on each side connecting the middle portion of the axle to the side of the box and having at its upper end a loop forming a draft attachment, shafts connecting therewith, an offsetting bracket bolted to the side of said loop, and a seat having two supporting-bars, one connected to the bolt of the offsetting bracket and the other connected to and supported by the shaft substantially as described.

5. A stripper or header comprising a cranked axle mounted on wheels, an open-top box having teeth at its front edge and mounted on the middle suspended portion of the cranked axle, a combined brace and draft attachment consisting of loops above the crank-axle to receive the rear ends of the shafts and downwardly-extended portions connecting the box and cranked axle, shafts extended into the loops of the draft attachment and having a transverse rock-shaft with crank-arms at the ends, a handle-lever fixed to the rock-shaft and provided with dog and notched bar for adjusting the same, and links connecting the crank-arms of the rock-shaft to the front part of the box substantially as and for the purpose described.

HARRY T. McCORMICK.
WILLIAM H. McCORMICK.

Witnesses:
SAM W. PURSLEY,
R. D. HUNTER.